United States Patent
Shin et al.

(10) Patent No.: US 9,244,733 B2
(45) Date of Patent: Jan. 26, 2016

(54) APPARATUS AND METHOD FOR SCHEDULING KERNEL EXECUTION ORDER

(71) Applicant: SAMSUNG ELECTRONICS CO., LTD., Suwon (KR)

(72) Inventors: Young Sam Shin, Hwaseong (KR); Min Young Son, Yongin (KR); Seung Won Lee, Hwaseong (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 13/672,085

(22) Filed: Nov. 8, 2012

(65) Prior Publication Data

US 2013/0205299 A1 Aug. 8, 2013

(30) Foreign Application Priority Data

Feb. 6, 2012 (KR) .................. 10-2012-0011723

(51) Int. Cl.
*G06F 9/46* (2006.01)
*G06F 9/48* (2006.01)

(52) U.S. Cl.
CPC ............. *G06F 9/4887* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 2003/0074387 A1* | 4/2003 | Tanaka | 709/103 |
| 2004/0268353 A1* | 12/2004 | Kanai et al. | 718/100 |
| 2008/0168447 A1* | 7/2008 | Lewis | 718/102 |
| 2008/0288748 A1 | 11/2008 | Sutardja et al. | |
| 2009/0210879 A1* | 8/2009 | Kaiser et al. | 718/103 |
| 2010/0175069 A1* | 7/2010 | Hoshika | 718/104 |
| 2010/0229179 A1* | 9/2010 | Moore et al. | 718/104 |
| 2011/0055479 A1* | 3/2011 | West et al. | 711/118 |
| 2013/0247066 A1* | 9/2013 | Dodge et al. | 718/104 |

FOREIGN PATENT DOCUMENTS

| | | |
|---|---|---|
| JP | 2010-113524 | 5/2010 |
| KR | 10-2007-0022034 | 2/2007 |
| KR | 10-2011-0006505 | 1/2011 |
| KR | 10-2011-0071018 | 6/2011 |
| KR | 10-2011-0073714 | 6/2011 |

\* cited by examiner

*Primary Examiner* — Diem Cao
(74) *Attorney, Agent, or Firm* — NSIP Law

(57) ABSTRACT

A method and apparatus for guaranteeing real-time operation of an application program that performs data processing and particular functions in a computer environment using a micro architecture are provided. The apparatus estimates execution times of kernels based on an effective progress index (EPI) of each of the kernels, and determines an execution order of the kernels based on the estimated execution times of the kernels and priority of the kernels.

17 Claims, 11 Drawing Sheets

FIG. 9
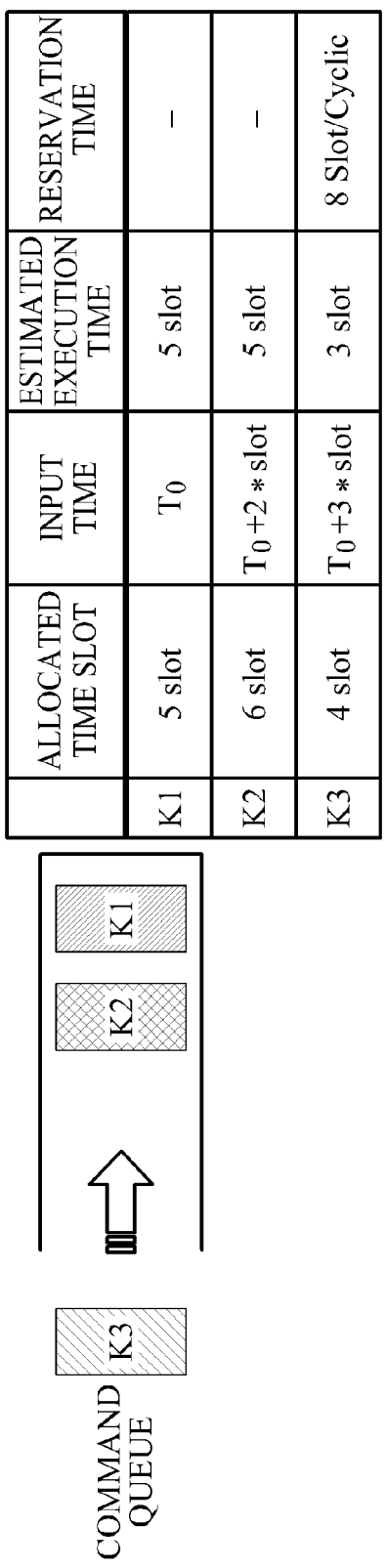
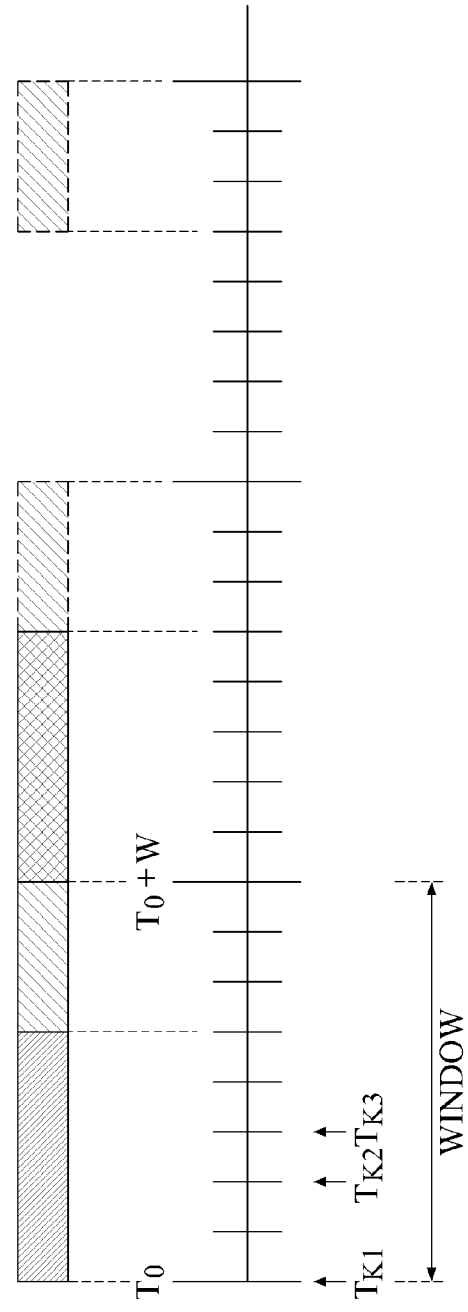

APPARATUS AND METHOD FOR SCHEDULING KERNEL EXECUTION ORDER

CROSS-REFERENCE TO RELATED APPLICATIONS

This application claims the priority benefit of Korean Patent Application No. 10-2012-0011723, filed on Feb. 6, 2012, in the Korean Intellectual Property Office, the disclosure of which is incorporated herein by reference.

BACKGROUND

1. Field

One or more embodiments of the following description relate to a method and apparatus for guaranteeing real-time operation through accurate prediction of performance of an application program that performs data processing and other particular functions in a computer environment using a micro architecture environment.

2. Description of the Related Art

With the number of personal mobile terminals increasing and becoming more widespread, information processing demands are also increasing and thus, sophisticated computing apparatuses are required to process various applications simultaneously. Furthermore, with an increase in the number of applications, such as multimedia applications, requiring real-time processing, demand for increased system performance is gradually increasing. Accordingly, application processing may not be efficiently performed with a single processor.

To overcome such limits, a semiconductor integration technology and a multiprocessor computing technology have been developed. The multiprocessor is superior to the single processor in terms of energy efficiency and performance.

However, since application programs are simultaneously executed on a multi core processor, an unexpected collision may occur in using a shared resource, thereby causing reduction in the performance.

SUMMARY

The foregoing and/or other aspects are achieved by providing a kernel execution order scheduling apparatus including an estimation unit to estimate execution times of kernels based on an effective progress index (EPI) for each of the kernels; and a control unit to determine an execution order of the kernels based on the estimated execution times of the kernels and priority of the kernels.

The control unit may include a preemptive schedule unit to schedule the execution order of the kernels based on deadlines of the kernels when a scheduling method for the kernels is a preemptive type.

The control unit may include a non-preemptive scheduling unit to schedule the execution order of the kernels in units of windows of a predetermined size based on the estimated execution times of the kernels when a scheduling method for the kernels is a non-preemptive type.

The non-preemptive scheduling unit may schedule the execution order of the kernels based on the order of input to a command queue, the priority of the kernels, and the estimated execution times of the kernels, such that the kernels are executed within a window including time slots each having a predetermined time period.

The non-preemptive scheduling unit may schedule the execution order of the kernels based on the estimated execution times of the kernels, such that a kernel executable within the window is executed first.

The control unit may further include a reserving and scheduling unit to reserve time slots of the window corresponding to a cycle with respect to kernels periodically executed according to characteristics of an application program among the kernels, and to schedule the execution order with respect to remaining kernels.

The control unit may further include a window change unit to change a size of the window by as much as the estimated execution times of the kernels when the remaining time slots within the window are smaller than the estimated execution times of the kernel.

The window change unit may change the window size when a kernel requesting to change the window size has a highest priority among the kernels stored in a command queue, when a requested degree of size change is within a predetermined window change range, and when the request for change of the window size is performed within a predetermined number of times.

The estimation unit may estimate the execution times of the kernels based on a final EPI of each kernel, a final memory progress index (MPI) representing influences of an environment in which the kernels are executed, and a final kernel progress index (KPI).

The estimation unit may include a progress index estimator to estimate the EPI, an MPI, and a KPI based on a history of a kernel repeatedly executed during execution of an application program.

The estimation unit may include an MPI estimator to estimate a final MPI based on a real progress index (RPI), the EPI, a memory efficiency (ME) of each of the kernels, and ME variation with respect to kernels to be executed; and a KPI estimator to estimate a final KPI based on the RPI, the EPI, an operating system (OS) efficiency, that is, a kernel efficiency (KE) with respect to each of the kernels, and KE variation with respect to kernels to be executed.

The estimation unit may include a first variation estimator to estimate the ME variation based on the ME of a kernel executed separately and the ME of kernels executed concurrently; and a second variation estimator to estimate the KE variation based on the KE of a kernel executed separately and the KE of kernels executed concurrently.

The estimation unit may include an ME estimator to estimate the ME based on a non-effective cycle of the kernels and the MPI; and a KE estimator to estimate the KE based on the non-effective cycle of the kernels and the KPI.

The progress index estimation unit may include an effective correlation function calculator to calculate a correlation function between an initial EPI and the EPI based on size of data constituting the kernels and a parallelization level of the data; a memory correlation function calculator to calculate a correlation function between an initial MPI and the MPI based on the size of data constituting the kernels and the parallelization level of the data; and a kernel correlation function calculator to calculate a correlation function between an initial KPI and the KPI based on the size of data constituting the kernels and the parallelization level of the data.

The kernel execution order scheduling apparatus may further include an effective progress counter (EPC) to generate the EPI by accumulating execution times for an instruction executed by an effective execution method; a memory progress counter (MPC) to generate an MPI by accumulating cycles expended for the kernels to access a shared memory;

and a kernel progress counter (KPC) to generate a KPI by accumulating cycles expended for execution of a system kernel.

The foregoing and/or other aspects are also achieved by providing a kernel execution order scheduling method including estimating execution times of kernels based on an effective progress index (EPI) for each of the kernels; and determining an execution order of the kernels based on the estimated execution times of the kernels and priority of the kernels.

The determining may include determining the execution order of the kernels based on an order of input to a command queue, the priority of the kernels, and the estimated execution times of the kernels, such that the kernels are executed within a window including time slots each having a predetermined time period.

The estimating may include estimating the execution times of the kernels based on a final EPI of each kernel, a final memory progress index (MPI) representing influences of an environment in which the kernels are executed, and a final kernel progress index (KPI).

The estimating may include estimating the EPI, an MPI, and a KPI based on a history of a kernel repeatedly executed during execution of an application program.

The estimating may include estimating a final MPI based on an RPI, the EPI, an ME of each of the kernels, and ME variation with respect to kernels to be executed; and estimating a final KPI based on the RPI, the EPI, an OS efficiency, that is, a KE with respect to each of the kernels, and KE variation with respect to kernels to be executed.

Since execution times of kernels are estimated relatively accurately, real-time scheduling of kernels may be guaranteed based on a window including predetermined time slots.

The execution times of the kernels may be estimated using the EPI that is a unique performance index, the MPI which is a performance index according to a system environment, and the KPI.

Real-time scheduling for guaranteeing response latency of the kernels may be performed based on the estimated execution times of the kernels.

A use rate of the time slot may be increased by extending the window in consideration of system performance and characteristics of the application program.

Through the estimated execution times and window-based scheduling, kernel execution performance in a heterogeneous multi core program may be secured. In addition, response rate requiring a real time response may be secured.

The foregoing and/or other aspects are achieved by providing a a heterogeneous computing environment system. The system includes a host processor comprising a plurality of central processing units, a computing device comprising a plurality of micro execution units, an estimation unit to estimate respective execution times of kernels based on an effective progress index (EPI) of each of the kernels, and a control unit to determine an execution order of the kernels based on the estimated respective execution times of the kernels and respective priorities of the kernels, wherein the host processor transmits commands for executing the kernels to the computing device based on the execution order determined by the control unit.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 9 illustrates a kernel execution order scheduling method according to still other example embodiments;

DETAILED DESCRIPTION

Figure 1:
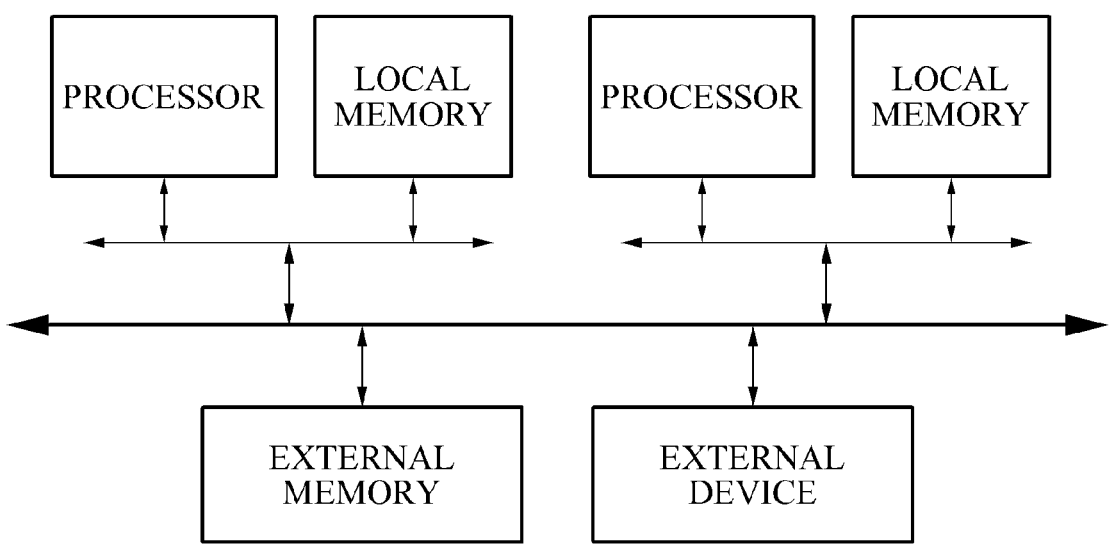
FIG. 1 illustrates a computing environment in which a general application program is executed.

Reference will now be made in detail to example embodiments, examples of which are illustrated in the accompanying drawings, wherein like reference numerals refer to the like elements throughout. Example embodiments are described below to explain the present disclosure by referring to the figures.

In an open parallel platform such as open computing language (OpenCL) and open graphics library (OpenGL), a host provides a platform for programming by utilizing computer resources of a device, in a heterogeneous computing environment.

In the heterogeneous computing environment, a host processor and a computing device are interconnected through a bus and the like. The host processor may transmit a program to be executed by the computing device through the bus. Here, the program to be executed by the computing device is generally referred to as a kernel.

The host processor transmits a command to the computing device to execute the kernel. Since the kernel is executed conventionally in a first in first out (FIFO) manner, guaranteeing a priority or response latency of the kernel is difficult.

As an application range of a graphic processing unit (GPU) increases and the GPU is used for acceleration of general application programs, priority-based kernel scheduling or kernel scheduling guaranteeing a real-time operation is necessitated. Since a GPU generally applies a non-preemptive kernel execution method, real-time scheduling in consideration of the non-preemptive kernel execution method is required.

When accurate measurement of performance and progress of the application program is available, measured values may be indexed and used as information to indicate a current state of the application program, for real-time scheduling, performance improvement, load balancing, and low power management.

In addition, when a state of collisions between resources shared in a system is efficiently monitored and indexed, indexes may be utilized as significant information for allocation, redistribution, and scheduling of the resources, which are necessary for execution of the application program. Here, the indexes for efficient distribution of the resources may be an essential factor.

It is difficult to measure the state of the application program accurately and precisely without causing a reduction in runtime performance. Execution times of instructions for execution of the application program are not uniform. Furthermore, accurate measurement of the state of the application program is difficult due to unexpected influences of other application programs executed in conjunction with the application program.

Even in a case of a single application program, a plurality of threads constituting the single application program may influence one another when executed together. Although the application program includes a single thread, measurement of the state of the application program is difficult because execution times of instructions constituting the single thread are not uniform.

In addition, collisions may occur when the application programs accesses a shared resource for simultaneous execution on a multi core processor. Such collisions may greatly reduce the performance of the system. Accordingly, an execution state of the system on the multi core processor needs to be accurately monitored. Also, a collision state of the shared resource needs to be monitored and expressed by indexes. The indexes may be used to control execution of kernels.

FIG. 1 illustrates a computing environment in which a general application program is executed.

In general, an application program performs a predetermined function using a memory and a hardware device as resources on a processor. The memory usually has a hierarchical structure. A memory having a high access speed may be provided on a local bus while a relatively slow but inexpensive memory may be provided on a system bus. A multiprocessor which includes a plurality of processors integrated in one system to meet for high performance demands may parallel-process the application program.

The application program generally includes at least one thread. A multiple thread may be executed on one processor, which is called multithreading. To measure performance and progress of the application program, performance and progress of the at least one thread need to be measured.

FIG. 1 is provided merely to illustrate an example of a general computing environment, and thus an environment for applying a kernel execution order scheduling apparatus according to example embodiments is not limited to the example provided in FIG. 1.

Figure 2:
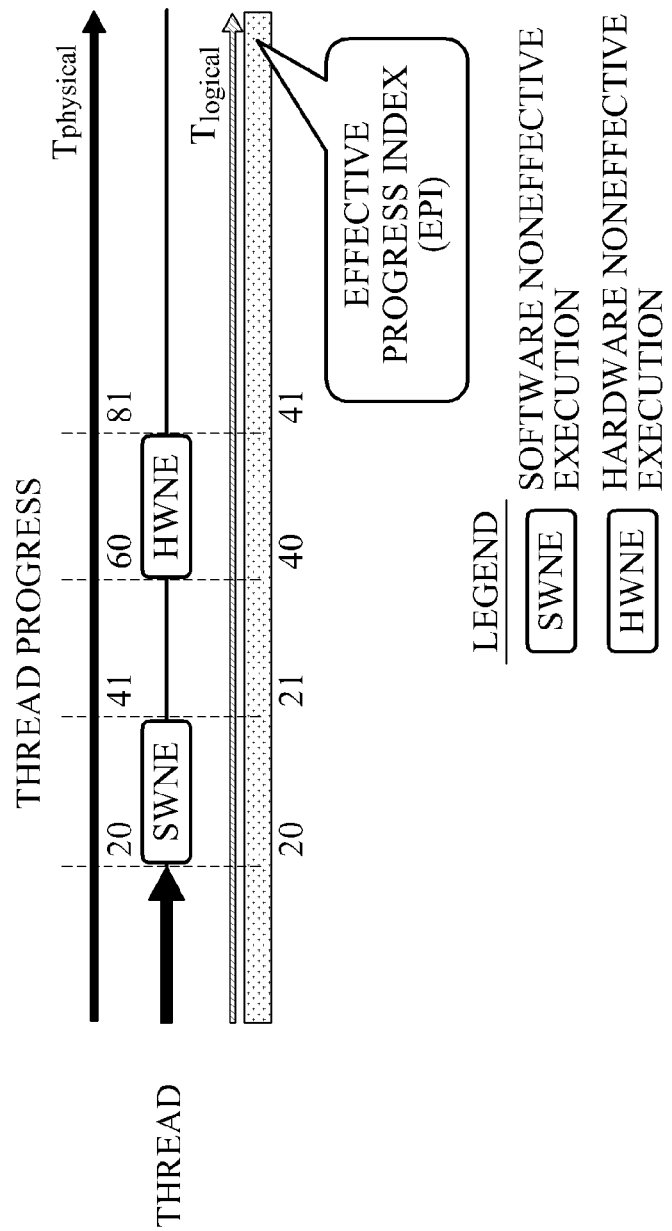
FIG. 2 illustrates a concept of an effective progression index according to example embodiments.

FIG. 2 illustrates a concept of an effective progression index according to example embodiments.

The application program may include a plurality of threads. Each thread may include instructions for performing a particular function. An instruction execution method may be divided into effective execution and non-effective execution.

When effective execution is used, a point in time at which completion of each instruction or group of instructions has occurred may have a uniform cycle. According to effective execution, the instructions are executed independently from external conditions. Also, the instructions executed by effective execution always need corresponding execution cycles to proceed with the program. In addition, the execution cycles of the instructions may be measured as processor cycles necessary for execution of instructions effective for the application program.

When non-effective execution is used, a point in time at which completion of each instruction or group of instructions has occurred may have a non-uniform delayed cycle. In most cases, instructions executed by non-effective execution have to use a shared resource such as an input and output terminal, a memory, and the like. When the instructions are executed by non-effective execution in a processor, tens of cycles may have to be delayed to complete execution of the instructions. The delay may occur when a shared resource accessed by the processor is used by another processor during execution of the corresponding instruction. That is, collisions may occur as different processors simultaneously access the shared resource, accordingly causing delay.

Referring to FIG. 2, a physical time for executing the thread regularly increases. The increase in the physical time may be expressed by a real progress index (RPI).

The instructions executed by effective execution may be completed within a same execution time. Conversely, instructions executed by non-effective execution may be affected by other threads. Also, points in time at which completion of the instructions executed by non-effective execution may be non-uniform due to conditions varied according to execution times.

The non-effective execution may be divided into hardware non-effective execution (HWNE) by which the non-effective execution is performed at the level of the instructions of the processor, and software non-effective execution (SWNE) by which the non-effective execution is performed by events generated during execution of the application program at the level of a function including the instructions or level of the kernel of the system. The kernel of the system may denote a system program constituting an operating system (OS) rather than a general user application program. HWNE and SWNE may be distinguished by a predetermined reference.

In an actual execution time of the thread, remaining execution time except the SWNE and the HWNE may all be defined as an effective execution time. Cycles necessary for the remaining execution time except the SWNE and the HWNE in execution of the thread have a constant value every time. Therefore, the remaining execution time may be expressed by an index to be used as an effective execution index of the thread. Herein, the effective execution index is defined as an effective progress index (EPI). The EPI may be expressed by the equations below.

$$P_{thread} = P_{effective\ execution} + P_{non-effective\ execution}$$

$$T_{effective\ thread\ progress} = T_{physical} - (T_{SWNE} + T_{HWNE})$$

As illustrated in the preceding equations, program $P_{thread}$ constituting the application program may include the effective execution $P_{effective\ execution}$ and the non-effective execution $P_{non-effective\ execution}$. A time $T_{effective\ thread\ progress}$ denoting an effective progress of the thread may be obtained by subtracting an SWNE execution time $T_{SWNE}$ and an HWNE execution time $T_{HWNE}$ from a physical time $T_{physical}$ for execution of the thread.

Instructions corresponding to the HWNE need to access the shared resource. Execution cycles of such instructions may include cycles according to an external input and output (I/O) or a memory access delay. An index obtained by accumulating the cycles expended for the external I/O or the memory access delay during execution of the thread, as used herein, is defined as a memory progress index (MPI).

A measure of cycles expended for processing events of the system in the kernel of the OS during execution of the thread may be defined as a kernel progress index (KPI). The KPI may be measured according to collisions for access to a kernel shared resource, for example a kernel shared memory, which are caused by a system function call such as interrupt, thread context switch, and malloc (e.g., a memory allocation).

Although the actual physical time increases during the SWNE and the HWNE, the EPI does not increase. Therefore, the EPI may be used as an index indicating an absolute progress position in execution of the thread. The EPI is an indispensable factor since it accurately indicates progress of an actual application program, rather than shares of the threads constituting the actual application program in the processor.

During execution of the thread, the SWNE and the HWNE may be determined according to a predetermined reference. The predetermined reference may be determined according to whether the execution time of the instructions measured so far or the function including the instructions is uniform or non-uniform. However, the suggested predetermined reference is provided only as an example and thus is not intended to limit the predetermined reference. That is, the predetermined reference may include a range easily conceivable by those skilled in the art covering the field of the example embodiments.

Table 1 below shows an example of the SWNE and the HWNE.

TABLE 1

| | Type | Example |
|---|---|---|
| SWNE | Schedule time | All thread states except running state Event or timer waiting (EventWait( ), sleep( ), . . . ) |
| | Interrupt managing | Interrupt managing instruction Interrupt service routine |
| | Dynamic resource allocation | Memory allocation/non-allocation Thread generation/termination |
| | Non-effective user function | Busy waiting |
| | Non-effective external device access | Blocked access for hardware device |
| | Others | |
| HWNE | External memory access | DRAM access |
| | Cache miss | Instruction/Data cache miss |
| | Branch | Dynamic branch prediction |
| | Others | |

In Table 1, the busy waiting does not correspond to the SWNE when data is transmitted through an actual I/O in a polling access type for an I/O access. The busy waiting corresponds to the SWNE only when a code is "repeatedly" executed to check the I/O state. Aside from the examples shown in FIG. 1, the SWNE and the HWNE may include all non-effective execution sections during execution of the thread.

The RPI may denote an accumulation value of the processor cycles accumulated during execution of the thread in the processor. In this instance, the RPI may be used as an index of the share of the thread in the processor.

The EPI may denote an accumulation value of effective execution cycles counted at the level of the processor cycle of the thread. In this instance, the EPI may be used as an index of an effective progress state of the thread.

The MPI may denote an accumulation value of cycles stalled by the collisions for access to the shared resource or expended. The MPI may be used as an index of the access to the shared resource and collision occurrence during execution of the thread.

The KPI may denote an accumulation value of non-effective cycles occurring by execution of a system kernel during execution of the thread. The KPI may be used as an index of the access to the shared resource and collision occurrence in the system kernel.

The state of the threads constituting the application program may be analyzed using the indexes. For example, a difference between the EPI and the RPI may be used to understand the progress of the actual application program with respect to a processor share of the application program.

The EPI is independent from the environment executing the kernel. That is, the EPI maintains a constant output with respect to the same input, irrespective of the execution environment. Therefore, the EPI may indicate execution characteristics of the application program separately from the system.

A kernel executed in a device of a heterogeneous computing system corresponds to the thread. Accordingly, the kernel execution order scheduling apparatus may monitor the execution performance of the kernel by applying any one or more of the EPI, the MPI, the KPI, and the RPI of the thread to the kernel.

More specifically, the EPI, the MPI, the KPI, and the RPI applied to the kernel executed in the device of the heterogeneous computing system may have meanings as follows. The EPI may be an index of the execution characteristics of the application program and the processor, independent from a change of the system executing the application program. The MPI may be an index reflecting structural characteristics of the memory among components of the system, and also reflecting the execution characteristics such as memory latency and collision. The KPI may be an index reflecting the characteristics of the OS of the system, that is, reflecting a response rate of the OS according to resource consumption of the kernel, synchronization, and shared resource allocation.

Figure 3:
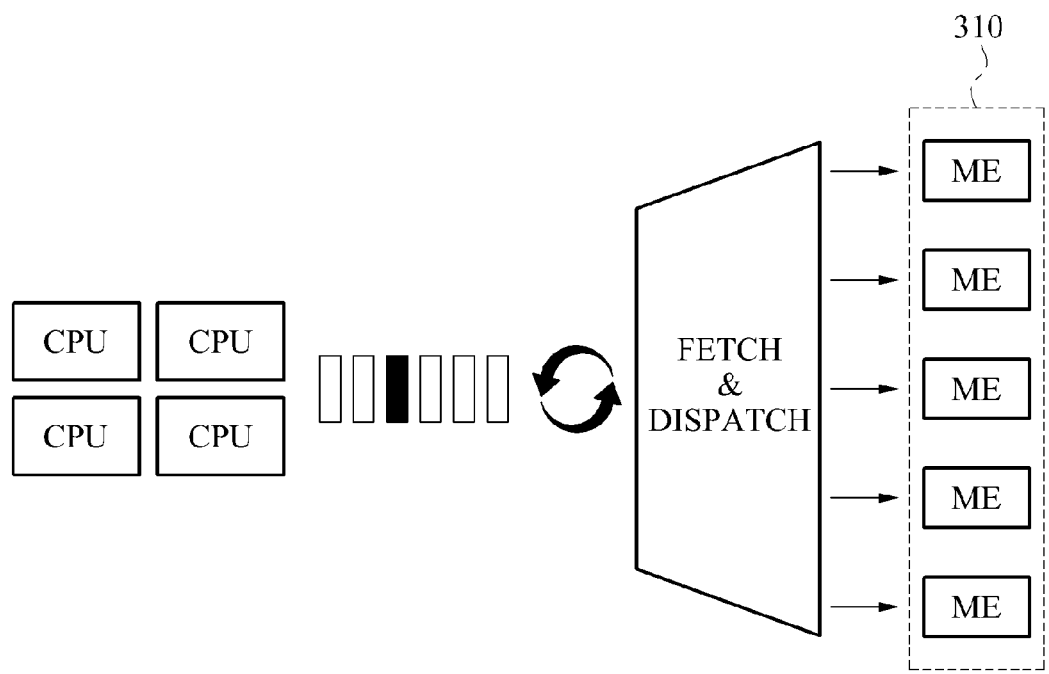
FIG. 3 illustrates a heterogeneous computing environment system including a host and a device, the host and the device to which a kernel execution order scheduling method is applicable according to example embodiments.

FIG. 3 illustrates a heterogeneous computing environment system including a host and a device 310 in which a kernel execution order scheduling method according to example embodiments is applicable.

Referring to FIG. 3, the host may include a plurality of central processing units (CPU). The device 310 may include a plurality of micro execution units.

The host may transmit a command for executing a kernel to the device 310 causing the device 310 to execute the kernel. The command may be pushed to a command queue and popped by the device 310. Accordingly, the corresponding kernel is executed.

Conventionally, the command pushed to the command queue may be popped in the FIFO manner without consideration of the priority or the latency. Therefore, in the conventional art, a high priority kernel may be in a pending state in the command queue without being processed, due to a low priority kernel being pushed to the command queue and executed earlier.

For kernel scheduling taking priority or latency, or both, into consideration, an execution order of kernels in the command queue may be rearranged in consideration of the priority or deadlines, or both, of the kernels pushed to the command queue. The term "deadline" may refer to a time limit for the operation of the corresponding kernel.

The execution times of the kernels pushed to the command queue are necessary for rearranging the kernel execution order based on the deadlines. Here, the EPI, the MPE, and the KPI may be used.

Figure 4:
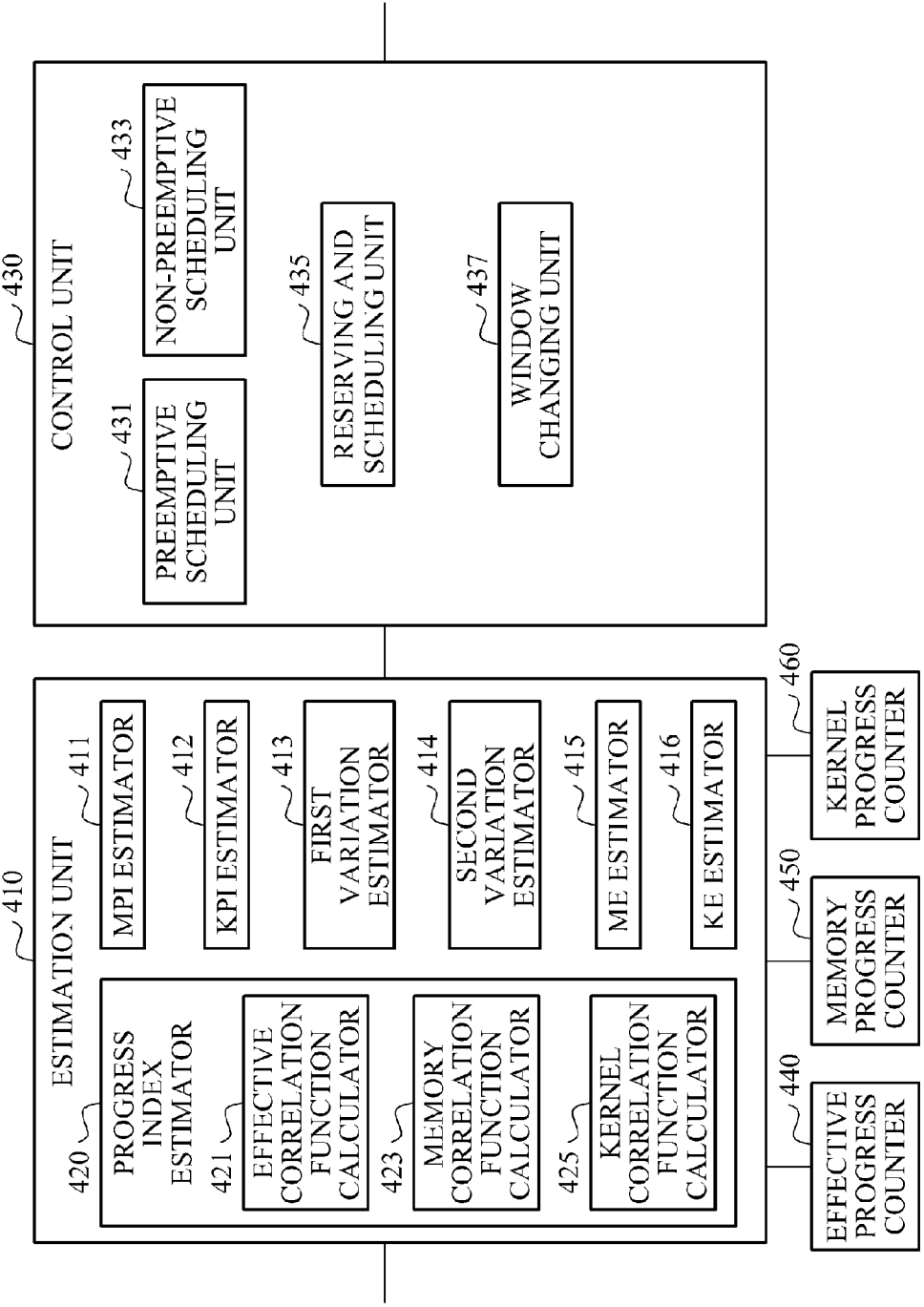
FIG. 4 illustrates a kernel execution order scheduling apparatus according to example embodiments.

FIG. 4 illustrates a kernel execution order scheduling apparatus according to example embodiments.

The kernel execution order scheduling apparatus may include, for example, an estimation unit 410, a control unit 430, an effective progress counter 440, a memory progress counter 450, and a kernel progress counter 460.

The estimation unit 410 may estimate execution times of kernels based on an EPI. In particular, the estimation unit 410 may estimate the execution times of the kernels based on a final EPI, which represents influences of an environment in which the kernels are executed, and a final KPI.

A sum total of the final EPI, the final MPI, and the final KPI may be used to estimate the execution time of a kernel.

The control unit 430 may determine an execution order of kernels based on the execution time estimated by the estimation unit 410 and priority of the kernels.

The estimation unit 410 may include, for example, a progress index estimator 420, a MPI estimator 411, a KPI estimator 412, a first variation estimator 413, a second variation estimator 414, a memory efficiency (ME) estimator 415, and kernel efficiency (KE) estimator 416.

The progress index estimator may estimate the EPI, an MPI, and a KPI based on a history of a kernel that is repeatedly executed during execution of an application program.

When the application program is executed, a certain kernel may be repeatedly executed. The progress index estimator 420 may estimate the EPI, the MPI, and the KPI every time the kernel is executed. The progress index estimator 420 may compare the EPI estimated before the repetition to the EPI estimated after the repetition, thereby calculating a correlation between the two EPIs. The progress index estimator 420 may also calculate correlations with respect to the MPI and the KPI.

The MPI estimator 411 may estimate the final MPI based on a real progress index (RPI), the EPI, an ME of each of the kernels, and ME variation $\Delta ME$ with respect to kernels to be executed.

The KPI estimator 412 may estimate the final KPI based on the physical progress index (PPI), the EPI, an OS efficiency with respect to the kernels, that is, KE efficiency, and KE variation $\Delta KE$ with respect to the kernels to be executed.

The first variation estimator 413 may estimate the ME variation $\Delta ME$ based on the ME of a kernel executed separately and the ME of kernels executed concurrently.

The second variation estimator 414 may estimate the KE variation $\Delta KE$ based on the KE of a kernel executed separately and the KE of kernels executed jointly.

The ME estimator 415 may estimate the ME based on a non-effective cycle of the kernels and the MPI.

A difference between the EPI and the RPI may be defined as the non-effective cycle $T_{ne}$ of the thread.

The ME estimator 415 may calculate the ME of the kernel using the non-effective cycle $T_{ne}$ and the MPI. Here, the ME may be expressed by an equation $ME=1-(MPI/T_{ne})$. Here, the ME may be used as an index indicating a ratio of an effective slot without collisions in a memory shared between kernels.

The KE estimator 416 may estimate the KE based on a non-effective cycle of the kernels and the KPI.

The KE estimator 416 may calculate the KE with respect to the kernels, using the non-effective cycle of the kernels and the KPI. The KE with respect to the kernels may be expressed by an equation $KE=1-(KPI/T_{ne})$. Here, the KE may be used as an index indicating a ratio of an effective slot without collisions in a kernel shared resource in an execution section of the OS.

The ME and the KE are system-dependent indexes, and therefore indicate a state of the system shown in the kernels. Therefore, an index reflecting the current state of the system may be generated by applying the ME and the KE in performance prediction.

The progress index estimator 420 may include, for example, an effective correlation function calculator 421, a memory correlation function calculator 423, and a kernel correlation function calculator 425.

In an application program produced using an open program as in the heterogeneous computing environment system, acceleration of the device may be used.

With respect to a portion capable of parallel acceleration in a module constituting the application program, the host of the heterogeneous computing environment system may compile a kernel, which may refer to a set of "data used for acceleration" and "instructions to be calculated", into a code executable in the device so that the device executes the kernel.

The kernel may be repeatedly executed in the application program. Here, various data sets to be executed as kernels may be used.

The progress index estimator 420 may profile the EPI, the MPI, and the KPI with respect to the repeatedly executed kernel. The progress index estimator 420 may model the profiled EPI, MPI, and KPI by a function related to an input data size (s) and an input data parallelization level (p).

The effective correlation function calculator 421 may calculate a correlation function between an initial EPI and the EPI based on size of data constituting the kernels and a parallelization level of the data.

The memory correlation function calculator 423 may calculate a correlation function between an initial MPI and the MPI based on the size of data constituting the kernels and the parallelization level of the data.

The kernel correlation function calculator 425 may calculate a correlation function between an initial KPI and the KPI based on the size of data constituting the kernels and the parallelization level of the data.

For example, presuming that $KPI_{t0}$, $MPI_{t0}$, and $EPI_{t0}$ denote performance indexes obtained from execution of a kernel in time $t_0$, performance indexes KPI', MPI', and EPI' according to next execution of a kernel may be expressed in relation to the previous performance indexes as follows. Respective performance indexes are independent from one another and may be modeled by the function related to s and p.

$$KPI'=f_k(s,p)*KPI_{t0}$$

$$MPI'=f_m(s,p)*MPI_{t0}$$

$$EPI'=f_e(s,p)*EPI_{t0}$$

The EPI' may be a performance index based on an effective execution cycle, which is deterministic with respect to the same input. Therefore, the EPI' may include an influenced portion $C_{ds}$ influenced by an input data set and an uninfluenced portion $C_{ids}$ not influenced by the input data set. The EPI' may be expressed by the equation below.

$$EPI'=C_{ids}+f'e(s,p)*C_{ds}$$

In execution of the kernel, presuming that $T_p$ denotes a predicted execution time actually predicted according to the s and the p, the predicted execution time $T_p$ may be calculated using the EPI', the MPI', and the KPI' as follows.

$$T'_p=KPI'+MPI'+EPI'$$

The progress index estimator 420 may estimate the EPI, the MPI, and the KPI modeled by the s and the p through emulation of a target system for executing the application program. The progress index estimator 420 may calculate the correlation function by comparing the EPI, the MPI, and the KPI of before the repetition with the EPI, the MPI, and the KPI of after the repetition.

The progress index estimator 420 may estimate the EPI, the MPI, and the KPI modeled by the s and the p through execution of a running code of a dedicated application program. In addition, the progress index estimator 420 may calculate the correlation function by comparing the EPI, the MPI, and the KPI of before the repetition with the EPI, the MPI, and the KPI of after the repetition.

The progress index estimator 420 may record values related to the input data size (s) and the parallelization level (p) input during actual execution of the kernel, utilizing the fact that the kernel is repeatedly executed in the device. In addition, the progress index estimator 420 may calculate the correlation function using the recorded values.

The progress index estimator 420 may calculate the correlation function using linear interpolation. The progress index estimator 420 may calculate a coefficient of the correlation function in the form of a linear function of the input data size (s) and the parallelization level (p). The coefficient may be stored per an executed kernel code for history-based prediction of the performance, and extracted for use in runtime execution.

When the kernels are simultaneously executed in the device, the KE and the ME of the kernels currently being executed may be reflected to prediction of the kernel execution time.

For example, efficiency indexes $ME_1$, $KE_1$, $ME_2$, $KE_2$, $ME_3$, and $KE_3$ of kernels K1, K2, and K3 may be calculated using the MPI and the KPI calculated through independent execution of each of the kernels K1, K2, and K3. In this case, when the kernels K1 and K2 are currently executed in the device and the efficiency indexes calculated using the MPI and the KPI of the kernels K1 and K2 are $'ME_1$, $'KE_1$, $'ME_2$, and $'KE_2$, efficiency variations caused by simultaneous execution of the kernels K1 and K2 may be calculated. The efficiency variations of each kernel may be expressed by equations as follows.

$$\Delta ME_1 = ME_1 - 'ME_1$$

$$\Delta KE_1 = KE_1 - 'KE_1$$

Variations of the ME and the KE of the kernel K2 may be calculated in the same manner. The variations of the ME and the KE may be calculated with respect to kernels executed in the device may be calculated by averaging the calculated variations with respect to when the kernels are simultaneously executed. That is, the variations of the ME and the KE may be expressed as follows.

$$\Delta KE = \Sigma KEn/n$$

$$\Delta ME = \Sigma MEn/n$$

A final kernel progress index $KPI'_s$ and a final memory progress index $MPI'_s$, that is, final performance prediction indexes reflecting conditions of the system, may be calculated in consideration of the $\Delta KE$, the $\Delta ME$, and the correlation function as follows.

The KPI', the MPI', and the EPI' may be estimated through the history-based performance prediction. A kernel execution time RPI' may be estimated using the KPI', the MPI', and the EPI'. When the $\Delta KE$ and the $\Delta ME$ indicating current system conditions are available, the $KPI'_s$ and the $MPI'_s$ reflecting a current performance index of the system may be calculated as follows.

$$KPI'_s = \{1-(KE+\Delta KE)\}*(RPI'-EPI')$$

$$MPI'_s = \{1-(ME+\Delta ME)\}*(RPI'-EPI')$$

A final execution time $T'_p$ of the kernel reflecting the current performance index of the system may be estimated as $T'_p = KPI'_s + MPI'_s + EPI'$. Since the EPI' is not influenced by characteristics of the system, the EPI' may be used along with the $KPI'_s$ and the $MPI'_s$.

The effective progress counter 440 may generate the EPI by accumulating execution times of an instruction executed by the effective execution.

The memory progress counter (MPC) 450 may generate the MPI by accumulating cycles expended for the kernel to access a shared memory.

The kernel progress counter (KPC) 460 may generate the KPI by accumulating cycles expended for system kernel execution and be shared of the threads in the processor.

Examples of the system kernel execution may include system functions such as interrupt, thread context switch, and malloc. Calls of the system functions may cause collisions during access to the kernel shared resource, thereby generating a non-effective execution section.

The control unit 430 may include, for example, a preemptive scheduling unit 431, a non-preemptive scheduling unit 433, a reserving and scheduling unit 435, and a window changing unit 437.

When a scheduling method of the kernels is a preemptive type, the preemptive scheduling unit 431 may schedule the execution order of the kernels based on deadlines of the kernels. That is, the preemptive scheduling unit 431 may schedule the execution order in order of the deadlines.

When the scheduling method of the kernels is a non-preemptive type, the non-preemptive scheduling unit 432 may schedule the execution order of the kernels in units of windows of a predetermined size based on the estimated execution times of the kernels.

The non-preemptive scheduling unit 433 may schedule the execution order of the kernels based on an order of input to a command queue, the priority of the kernels, and the estimated execution times of the kernels, such that the kernels are executed within the window including time slots each having a predetermined time period.

In addition, the non-preemptive scheduling unit 433 may schedule the execution order of the kernels based on the estimated execution times of the kernels, such that a kernel executable within the window is executed first.

The reserving and scheduling unit 435 may reserve time slots of the window corresponding to a cycle, with respect to kernels periodically executed, according to characteristics of an application program among the kernels, and may schedule the execution order with respect to remaining kernels. The reserving and scheduling unit 435 may perform scheduling such that other kernels but reserved kernels are not executed in the reserved time slot.

The window changing unit 437 may change a size of the window by as much as the estimated execution times of the kernels when the remaining time slots within the window are smaller than the estimated execution times of the kernel.

The window changing unit 437 may change the window size when a kernel requesting to change the window size has a highest priority among the kernels stored in the command queue, when a requested degree of size change is within a predetermined window change range, and when the request for change of the window size is performed within a predetermined number of times.

Figure 5:
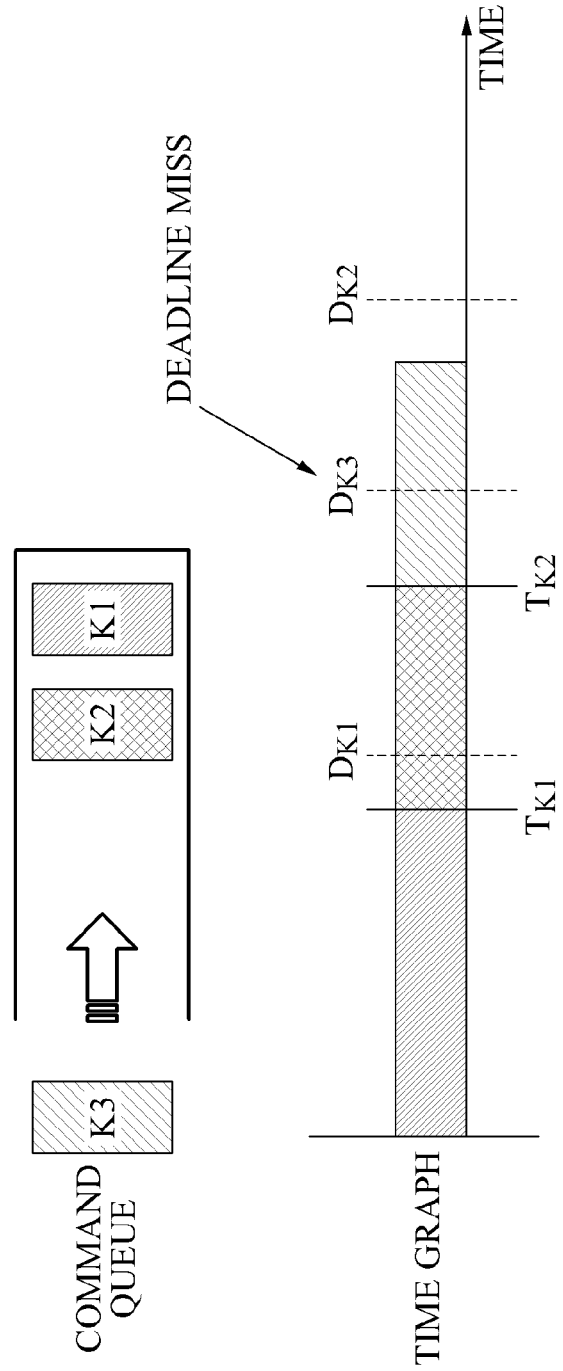
FIG. 5 illustrates a conventional general kernel execution method.

FIG. 5 illustrates a conventional general kernel execution method.

Referring to FIG. 5, kernels K1, K2, and K3 may be executed in order of being input to the command queue, that is, in a FIFO manner. The kernel K1 is executed for a time $T_{k1}$ and meets a deadline $D_{k1}$. The kernel K2 is executed for a time $T_{k2}$ and meets a deadline $D_{k2}$. However, in case of the kernel K3, a time remaining after the time $T_{k2}$ to a deadline $D_{k3}$ is shorter than a required execution time of the kernel K3. Therefore, the deadline $D_{k3}$ may not be met. Here, the deadlines refer to a time limit to execute a kernel for execution of a corresponding application program without errors. When the deadline is not met, the application program corresponding to the kernel may not be executed or errors may occur during the execution.

Figure 6:
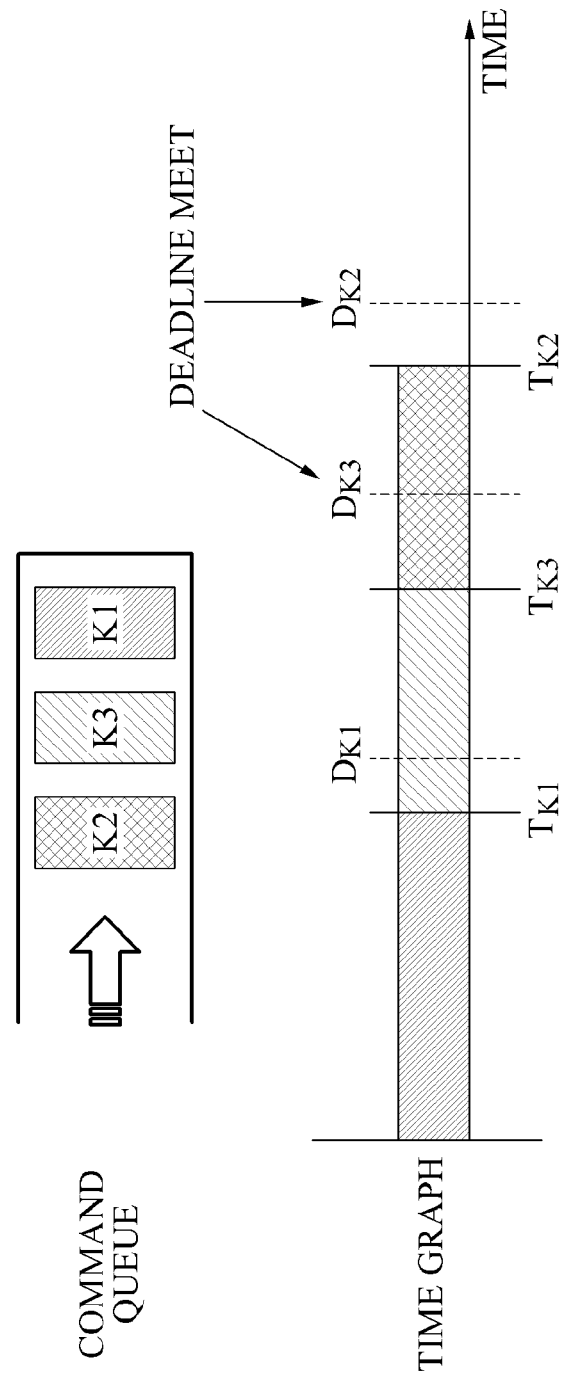
FIG. 6 illustrates a kernel execution order scheduling method according to example embodiments.

FIG. 6 illustrates a kernel execution order scheduling method according to example embodiments.

That is, FIG. 6 shows an example in which preemption of a kernel to be executed in a device is available.

When preemption of a kernel is available, execution of a kernel being currently executed may be suspended to execute a different, higher priority kernel. The device may rearrange a command queue such that the kernels are executed to meet deadlines of estimated kernels among kernels pushed to the command queue.

In comparison with the case of FIG. 5, in FIG. 6, since a deadline of a kernel K3 is earlier than a deadline of a kernel K2, the device may rearrange the command queue such that the kernel K3 is executed prior to the kernel K2.

When the deadline can be met although execution of another kernel is started after the execution time of the currently executed kernel expires, the device may not replace the currently executed kernel with another kernel.

In addition, when the deadline cannot be met even by the rearrangement, the device may rearrange the command queue in consideration of priority such that a higher priority kernel is executed first.

Figure 7:
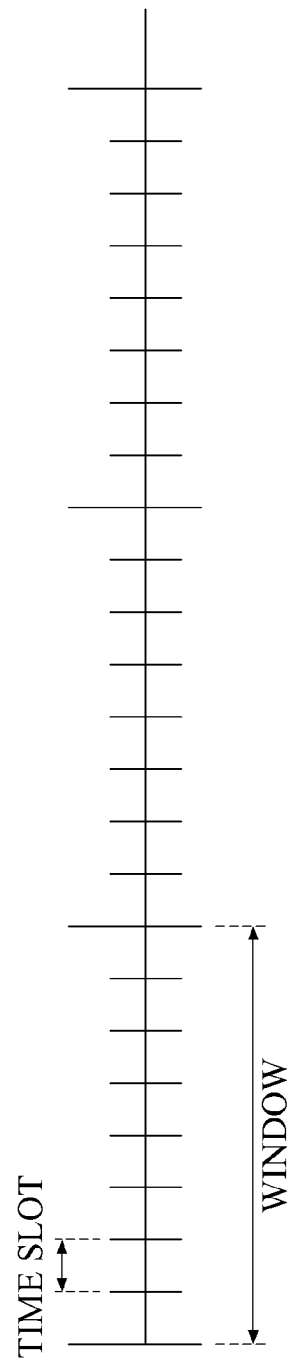
FIG. 7 illustrates a window and a time slot used for a kernel execution order scheduling method according to example embodiments.

FIG. 7 illustrates a window and a time slot used for a kernel execution order scheduling method according to example embodiments.

When a kernel to be executed in a device is non-preemptive, the following limits may be generated.

In a state in which a lower priority kernel pushed to a command queue is dispatched from the command queue and executed, execution of a higher priority kernel pushed to the command queue later may not be started until execution of the kernel being executed is completed. That is, the device may not suspend execution of the kernel being executed in order to execute the higher priority kernel.

The device may limit a device use time for each kernel. That is, kernel execution may be managed in units of window having a predetermined size.

When the kernel execution is secured in units of the window, real-time scheduling of an application program may be guaranteed. The window may be used as a minimum unit for guaranteeing the real time operation. Performance of the application program may be tuned by adjusting the window size.

The window may include time slots divided by a predetermined time period. The kernels may be allocated with the time slots and executed in the device.

The kernels may be allocated with the time slots by the device, the time slots executable in the window in consideration of the priority of the application program. The kernels may be executed by the device in the window according to the allocated time slots. When the kernels are beyond a current window at the time of starting execution, the kernels may be executed in a next window.

At the time of starting a new window, when no kernel has a higher priority than a corresponding kernel, the kernel may be executed according to the allocated time slot.

Figure 8:
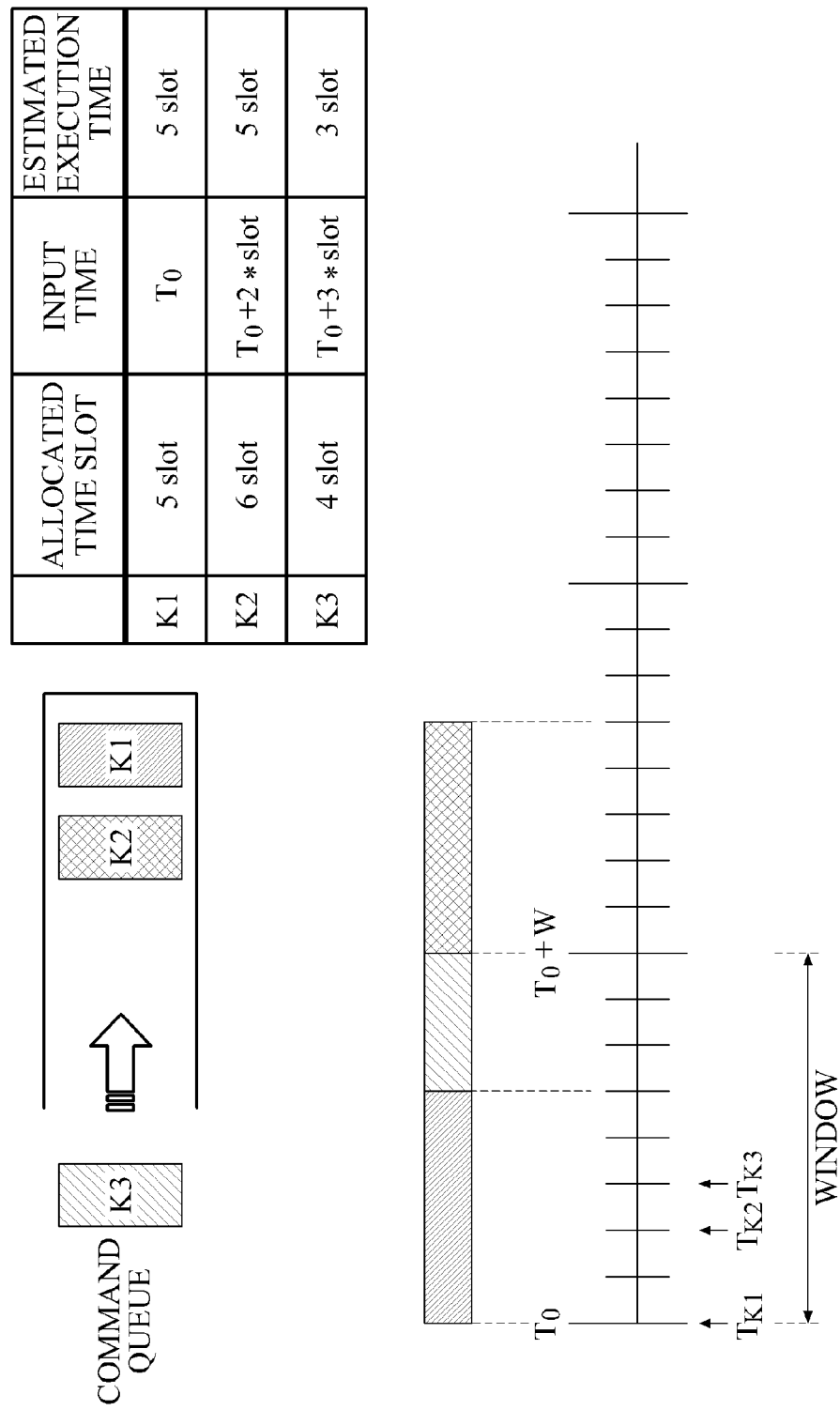
FIG. 8 illustrates a kernel execution order scheduling method according to other example embodiments.

FIG. 8 illustrates a kernel execution order scheduling method according to other example embodiments.

Referring to FIG. 8, kernels K1, K2, and K3 are pushed to a command queue at starting points $T_{k1}$, $T_{k2}$, and $T_{k3}$, respectively. When the $T_{k1}$ is $T_0$, the kernel K2 is pushed 2 slots after the kernel K1, and the kernel K3 is pushed 3 slots after the kernel K1.

Time slots allocated to the kernels K1, K2, and K3 may be 5 slots, 6 slots, and 4 slots, respectively. At a point in time $T_0$, the kernel K1 is estimated to be completely executed using 5 slots in a current window. The 5 slots estimated herein may correspond to an execution time of the kernel estimated by the estimation unit 410 shown in FIG. 4. The kernel K1 may be popped from the command queue and executed during 5 slots in the device.

However, since the kernel K2 pushed to the command queue at the point in time $T_{k2}$ is allocated with 6 slots, although the estimated execution time is 5 slots, execution of the kernel K2 may not be completed in the current window ($T_0+W$). Therefore, the kernel K2 may not be executed but remain in the command queue.

The kernel K3 pushed to the command queue after the kernel K2 has 3 slots as an estimated execution time, from the point in time $T_0+W$, which is an execution completion time of the K1. Since the 3 slots may be completed within the current window, the kernel K3 may be scheduled to be executed at a point in time at which execution of the kernel K1 is completed. Since 4 slots are allocated to the kernel K3, the kernel K3 may be executed during 3 slots which is the estimated execution time.

At the point in time $T_0+W$ when a new window is started, the kernel K2 may be popped from the command queue and executed in the device. Thus, complete execution of the kernels K1, K2, and K3 in units of the window may be secured.

FIG. 9 illustrates a kernel execution order scheduling method according to still other example embodiments.

When the kernel is executed periodically, scheduling may be performed by reserving a specific time slot. A cycle and a number of slots to be reserved may be determined at an application program level, considering characteristics of the application program. A kernel execution order scheduling apparatus may schedule other kernels such that the reserved slot is vacant for a reserved kernel, based on the cycle and the number of slots to be reserved.

Referring to FIG. 9, a kernel K3 may be executed in an 8-slot period. Time slots may be reserved for 3 slots in which the estimated execution time estimated in units of 8 slots from a time slot in which the kernel K3 is first executed. Kernels K1 and K2 may be scheduled to be executed in the remaining time slots.

Figure 10:
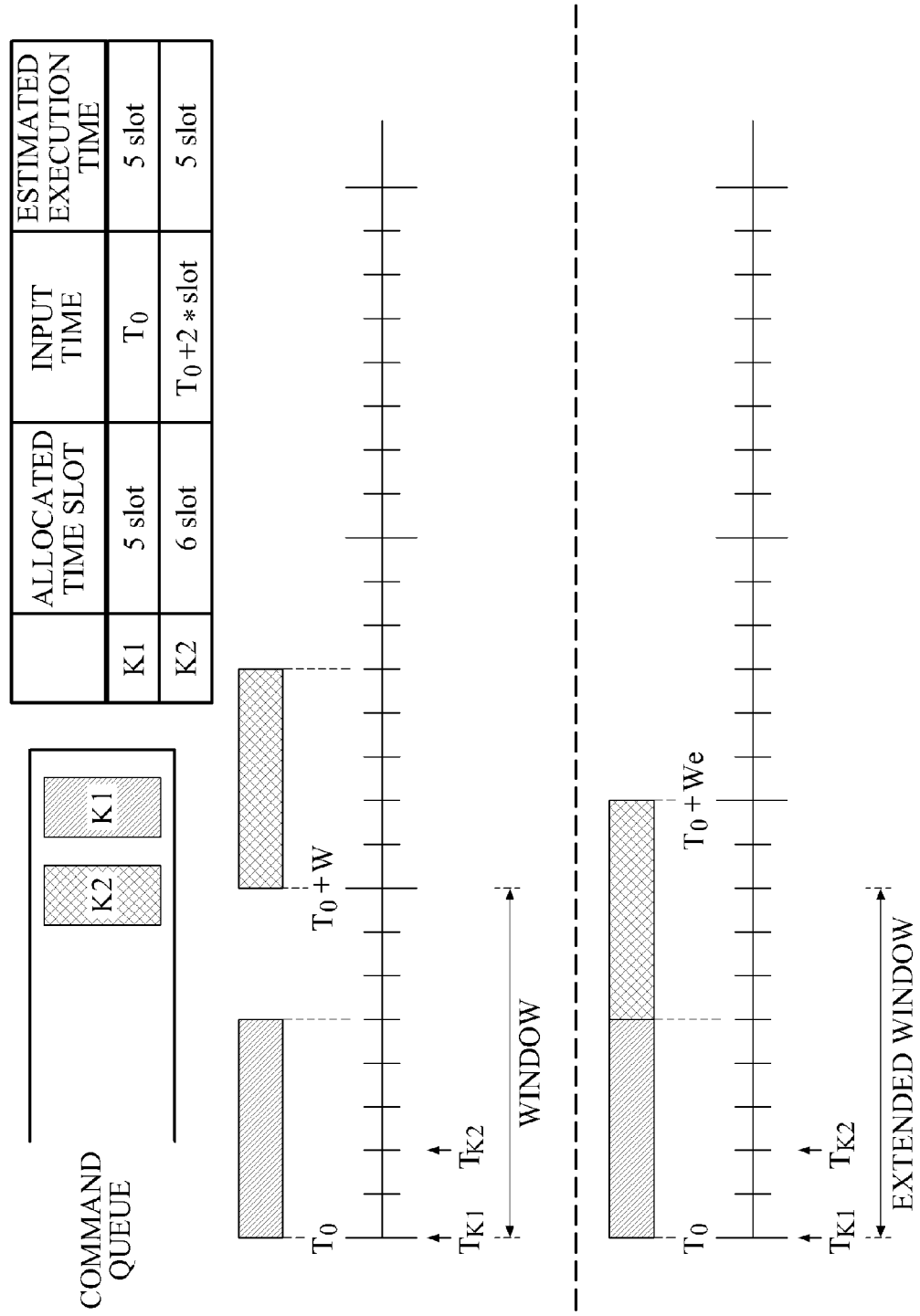
FIG. 10 illustrates a kernel execution order scheduling method according to yet other example embodiments.

FIG. 10 illustrates a kernel execution order scheduling method according to yet other example embodiments.

A window size may be varied according to an execution time of a kernel. Window extension may increase a use rate of a time slot.

Referring to FIG. 10, 3 slots are left in a current window at a point in time at which execution of a kernel K2 is available. Since the 3 slots are smaller than 5 slots for the estimated completion time of the kernel K2, execution of the kernel K2 may be started in a next window.

However, when extension of the window is possible, a scheduler of a device may be requested to extend the window size by the 2 slots necessary for completion of the execution. When the scheduler approves the request, the device may start execution of the kernel.

Whether the request for the window extension is approved may be determined based on conditions as follows.

A kernel execution order scheduling apparatus may extend the window when no kernel having a higher priority than a current kernel requested for the window extension is left in the command queue, when an extension slot is within a range of a slot allowed for the window extension (MAX_WINDOW_EXTENSION), and when the window is already extended and therefore the execution time of the executed kernel has not exceeded the extended window.

The kernel execution order scheduling apparatus may reject a request that fails to meet the aforementioned conditions so as to guarantee real-time operation. A maximum number of extension slots may be determined in consideration of characteristics of an application program and performance of the system.

Figure 11:
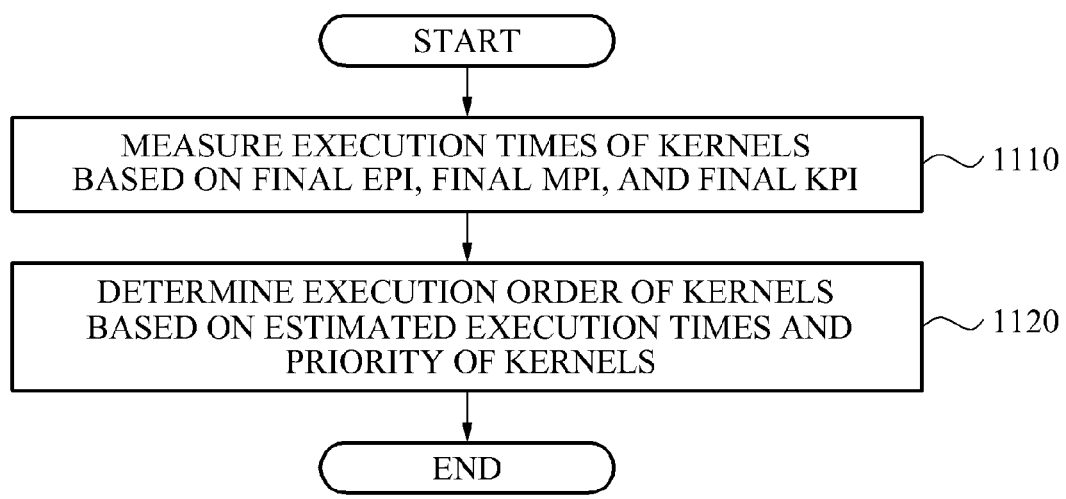
FIG. 11 illustrates a kernel execution order scheduling method according to example embodiments.

FIG. 11 illustrates a kernel execution order scheduling method according to example embodiments.

In operation 1110, a kernel execution order scheduling apparatus may estimate execution times of kernels based on one or more of a final EPI of each of the kernels, a final MPI representing influences of an environment in which the kernels are executed, and a final KPI of each of the kernels.

Since the EPI is independent from the system environment, a first estimated EPI may be used as the final EPI.

The kernel execution order scheduling apparatus may estimate the final MPI based on at least one of an RPI, the EPI, an ME of each kernel, and ME variation of kernels to be executed.

The kernel execution order scheduling apparatus may estimate a final KPI based on the RPI, the EPI, an OS efficiency, that is, a KE with respect to each kernel, and KE variation of kernels to be executed.

In operation 1120, the kernel execution order scheduling apparatus may determine the kernel execution order based on the estimated times of the kernels and priority of the kernels.

The kernel execution order scheduling apparatus may determine the execution order based on an order of kernels input to a command queue, the priority of the kernels, and the estimated execution times of the kernels, such that the kernels are executed within a window including time slots each having a predetermined time period.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

The described hardware devices may be configured to act as one or more software or firmware modules in order to perform the operations of the above-described embodiments, or vice versa. Any one or more of the software or firmware modules described herein may be executed by a controller such as a dedicated processor unique to that unit or by a processor common to one or more of the modules. The described methods may be executed on a general purpose computer or processor or may be executed on a particular machine such as the kernel execution order scheduling apparatus described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A kernel execution order scheduling apparatus comprising:
    an estimation unit configured to estimate respective execution times of kernels based on an effective progress index (EPI) of each of the kernels; and
    a hardware-based control unit configured to determine an execution order of the kernels based on the estimated respective execution times of the kernels and respective priorities of the kernels,
    wherein the estimation unit comprises
    a progress index estimator to estimate the EPI a memory progress index (MPI), and a kernel progress index (KPI) based on a history of a kernel repeatedly executed during execution of an application program;
    an MPI estimator to estimate a final MPI based on a real progress index (RPI), the EPI, a memory efficiency (ME) of each of the kernels, and ME variation with respect to kernels to be executed; and
    a KPI estimator to estimate a final KPI based on the RPI, the EPI, an operating system (OS) efficiency, that is, a kernel efficiency (KE) with respect to each of the kernels and KE variation with respect to kernels to be executed.

2. The kernel execution order scheduling apparatus of claim 1, wherein the control unit comprises a preemptive schedule unit configured to schedule the execution order of the kernels based on deadlines of the kernels when a scheduling method for the kernels is a preemptive type.

3. The kernel execution order scheduling apparatus of claim 1, wherein the control unit comprises a non-preemptive scheduling unit configured to schedule the execution order of the kernels in units of windows of a predetermined size based on the estimated execution times of the kernels when a scheduling method for the kernels is a non-preemptive type.

4. The kernel execution order scheduling apparatus of claim 3, wherein the non-preemptive scheduling unit schedules the execution order of the kernels based on an order of input of the kernels to a command queue, the respective priority of the kernels, and the estimated respective execution times of the kernels, such that the kernels are executed within a window including time slots each having a predetermined time period.

5. The kernel execution order scheduling apparatus of claim 4, wherein the non-preemptive scheduling unit schedules the execution order of the kernels based on the estimated execution times of the kernels, such that a kernel that is executable within the window is executed first.

6. The kernel execution order scheduling apparatus of claim 3, wherein the control unit further comprises a reserving and scheduling unit configured to reserve time slots of a window corresponding to a cycle with respect to kernels periodically executed according to characteristics of an application program among the kernels, and configured to schedule the execution order with respect to remaining kernels.

7. The kernel execution order scheduling apparatus of claim 6, wherein the control unit further comprises a window changing unit configured to change a size of the window by as much as an estimated execution times of a kernel when the remaining time slots within the window are smaller than the estimated execution times of the kernel.

8. The kernel execution order scheduling apparatus of claim 7, wherein the window changing unit changes the size of the window when a kernel requesting to change the size of the window has a highest priority among the kernels stored in a command queue and when a requested degree of a size change is within a predetermined window change range and when the request for change of the size of the window is performed within a predetermined number of times.

9. The kernel execution order scheduling apparatus of claim 1, wherein the estimation unit estimates the execution times of the kernels based on a final EPI of each kernel, a final memory progress index (MPI) representing influences of an environment in which the kernels are executed, and a final kernel progress index (KPI).

10. The kernel execution order scheduling apparatus of claim 1, wherein the estimation unit comprises:
   a first variation estimator configured to estimate the ME variation based on the ME of a kernel executed separately and the ME of kernels executed jointly; and
   a second variation estimator configured to estimate the KE variation based on the KE of a kernel executed separately and the KE of kernels executed jointly.

11. The kernel execution order scheduling apparatus of claim 1, wherein the estimation unit comprises:
   an ME estimator configured to estimate the ME based on a non-effective cycle of the kernels and the MPI; and
   a KE estimator configured to estimate the KE based on the non-effective cycle of the kernels and the KPI.

12. The kernel execution order scheduling apparatus of claim 1, wherein the progress index estimation unit comprises:
   an effective correlation function calculator configured to calculate a correlation function between an initial EPI and the EPI based on size of data constituting the kernels and a parallelization level of the data;
   a memory correlation function calculator configured to calculate a correlation function between an initial MPI and the MPI based on the size of data constituting the kernels and the parallelization level of the data; and
   a kernel correlation function calculator configured to calculate a correlation function between an initial KPI and the KPI based on the size of data constituting the kernels and the parallelization level of the data.

13. The kernel execution order scheduling apparatus of claim 1, further comprising:
   an effective progress counter (EPC) configured to generate the EPI by accumulating execution times for an instruction executed by an effective execution method;
   a memory progress counter (MPC) configured to generate an MPI by accumulating cycles expended for the kernels to access a shared memory; and
   a kernel progress counter (KPC) configured to generate a KPI by accumulating cycles expended for execution of a system kernel.

14. A kernel execution order scheduling method comprising:
   estimating, by way of a processor, respective execution times of kernels based on an effective progress index (EPI) of each of the kernels; and
   determining an execution order of the kernels based on the estimated respective execution times of the kernels and respective priorities of the kernels,
   wherein the estimating comprises
   estimating the EPI, an memory progress index (MPI), and a kernel progress index (KPI) based on a history of a kernel repeatedly executed during execution of an application program;
   estimating a final MPI based on a real progress index (RPI), the EPI, a memory efficient ME for each of the kernels and ME variation with respect to kernels to be executed; and
   estimating a final KPI based on the RPI, the EPI, an operating system (OS) efficiency, that is, a kernel efficiency (KE) with respect to each of the kernels, and KE variation with respect to kernels to be executed.

15. The kernel execution order scheduling method of claim 14, wherein the determining comprises determining the execution order of the kernels based on an order of input of the kernels to a command queue, the respective priority of the kernels, and the estimated respective execution times of the kernels, such that the kernels are executed within a window including time slots each having a predetermined time period.

16. The kernel execution order scheduling method of claim 14, wherein the estimating comprises estimating the execution times of the kernels based on a final EPI of each kernel, a final memory progress index (MPI) representing influences of an environment in which the kernels are executed, and a final kernel progress index (KPI).

17. A heterogeneous computing environment system comprising:
   a host processor comprising a plurality of central processing units;
   a computing device comprising a plurality of micro execution units;
   an estimation unit configured to estimate respective execution times of kernels based on an effective progress index (EPI) of each of the kernels; and
   a control unit configured to determine an execution order of the kernels based on the estimated respective execution times of the kernels and respective priorities of the kernels,
   wherein the host processor is configured to transmit commands for executing the kernels to the computing device based on the execution order determined by the control unit,
   wherein the estimation unit comprises
   a progress index estimator to estimate the EPI, a memory progress index (MPI), and a kernel progress index (KPI) based on a history of a kernel repeatedly executed during execution of an application program;
   an MPI estimator to estimate a final MPI based on a real progress index (RPI), the EPI, a memory efficiency (ME) of each of the kernels, and ME variation with respect to kernels to be executed; and
   a KPI estimator to estimate a final KPI based on the RPI, the EPI, an operating system (OS) efficiency, that is, a kernel efficiency (KE) with respect to each of the kernels and KE variation with respect to kernels to be executed.

* * * * *